United States Patent [19]
Fritz

[11] Patent Number: 4,640,139
[45] Date of Patent: Feb. 3, 1987

[54] STRAIN GAUGE DEVICE FOR MEASURING MULTICOMPONENT FORCES AND TORQUES

[75] Inventor: Harald Fritz, Waldbronn, Fed. Rep. of Germany

[73] Assignee: Siemens Aktiengesellschaft, Munich, Fed. Rep. of Germany

[21] Appl. No.: 868,189

[22] Filed: May 21, 1986

Related U.S. Application Data

[63] Continuation of Ser. No. 634,970, Jul. 27, 1984, abandoned.

[30] Foreign Application Priority Data

Jul. 27, 1983 [DE] Fed. Rep. of Germany ....... 3327141
Feb. 20, 1984 [DE] Fed. Rep. of Germany ....... 3406059

[51] Int. Cl.$^4$ .............................................. G01L 5/16
[52] U.S. Cl. ................................ 73/862.04; 364/508
[58] Field of Search ........... 73/862.04, 862.05, 862.06, 73/147; 364/505, 508

[56] References Cited

U.S. PATENT DOCUMENTS 2,478,720  8/1949  Sourwine et al. ................... 364/508
3,780,573  12/1973  Reus ................................. 73/862.04
3,939,704  2/1976  Zipin .................................... 336/30

FOREIGN PATENT DOCUMENTS 2727704  1/1979  Fed. Rep. of Germany .

OTHER PUBLICATIONS

Cunningham et al, "Two Devices for Measuring the Forces Acting on the Human Body During Walking", Society for Experimental Stress Analysis, vol, IX, No. 2, 1952, pp. 75–90.

Primary Examiner—Donald O. Woodiel
Attorney, Agent, or Firm—Kenyon & Kenyon

[57] ABSTRACT

A strain gauge device for measuring multicomponent forces and torques comprises a cylindrical body clamped at one end and attached at a free end to a force-transmission cup partially surrounding the cylinder. At least seven wire strain gauges are attached to the external surface of the cylinder in three parallel planes extending transversely to the axis of the cylinder. The gauges include longitudinally extending gauges, circumferentially extending gauges and gauges oriented at a 45° angle with respect to the transversely extending planes. The gauges are electrically coupled parallel to one another in respective circuits. A microprocessor may be connected to the circuits for detecting the voltage drops across the strain gauges and calculating therefrom the orthogonal components of an unbalanced force and a torque applied to the measuring body.

11 Claims, 12 Drawing Figures

STRAIN GAUGE DEVICE FOR MEASURING MULTICOMPONENT FORCES AND TORQUES

This application is a continuation of application Ser. No. 634,970, filed July 27, 1984, now abandoned.

BACKGROUND OF THE INVENTION

This invention relates to a device for use in the measurement of multicomponent forces and torques, the device including wire strain gauges.

Such devices are described in German Patent Document (Auslegeschriften) Nos. 2,529,796 and 2,727,704 and in a paper in the Journal *Elektronik*, Dec. 17, 1982, page 11, entitled "Feeling Sense for Industrial Robots."

In known force and torque measuring devices, several selectively component-sensitive measuring springs are used for detecting the orthogonal components of applied forces and torques. Such devices include wheel- or cage-shaped measuring bodies which can be produced with the required precision only at considerable expense. The expense for wire strain gauges in measuring bodies using such gauges is also considerable.

An object of the present invention is to provide such a measuring device which is easy to manufacture and less expensive.

Another object of the present invention is to provide such a measuring device which is physically smaller than known devices.

SUMMARY OF THE INVENTION

In accordance with the present invention, the composite force and the total torque acting on the measuring device are split into their respective orthogonal components, the directions of the components corresponding to the axes of a right-handed coordinate system. The splitting is accomplished by means of selectively component-sensitive strain gauges disposed on a single elastically and substantially uniformly deformable measuring body. It is understood that it is impossible to position and orient strain gauges so that the action of a force along one of three mutually orthogonal directions or the action of a torque along one of three mutually orthogonal directions is mutually exclusive in its effects upon the strain gauges of the effects thereon of force and torque components acting along the other mutually orothongal coordinate axes. There will always be some overlap in the effects of the respective force components and torque components. However, it is possible with a relatively small and inexpensive design of the measuring device to improve the selectivity to such an extent that the measuring result does not differ from that of known force and torque measuring devices.

In accordance with the present invention, a multiplicity of strain gauges are mechanically attached to an elastically and substantially uniformly deformable body and are electrically connected at one end to each other. The gauges are operatively connectable to a current supply and to computing means for supplying thereto voltages partially determined by the magnitudes and directions of a composite unbalanced force and a composite torque acting on the measuring device. The voltages supplied to the computing means by the strain gauges are also partially determined by the respective positions and orientations of the gauges with respect to the deformable body. The gauges are disposed about the deformable body at positions and orientations so that a sufficient number of equations are available for use by the computing means to calculate each component of the component unbalanced force and each component of the composite torque.

Advantageously, the deformable body takes the form of a hollow cylinder firmly clamped at one end. The free end of the cylinder is rigidly connected to a force introduction cup partially surrounding the cylinder. The rim of the force introduction cup defines a plane extending traversely with respect to an axis of symmetry of the cylinder, this plane being preferably located approximately in the middle third of the effective length of the cylinder.

The gauges include at least seven gauges mounted on the cylinder in the plane defined by the rim of the cup and in at least one other plane parallel thereto. The seven gauges include a first pair of gauges disposed on diametrically opposed sides of the cylinder and oriented longitudinally, i.e., parallel to the axis of the cylinder and perpendicularly to the transverse planes. The seven gauges further include a second pair of gauges lying in a circumferential direction with respect to the cylinder and disposed on diametrically opposed sides of the cylinder from one another. The seven gauges also include at least a third pair of gauges inclined at substantially 45° with respect to the transverse planes and at substantially 90° with respect to one another.

With the above-described elements, three mutually orthogonal forces and three mutually orthogonal torques can be measured. For a smaller number of mutually orthogonal forces and/or torques, fewer strain gauges are sufficient.

In accordance with a particular feature of the present invention, the circumferentially oriented gauges are disposed in the plane defined by the rim of the cup. The longitudinally oriented gauges and the inclined gauges are disposed in a first additional plane spaced from and parallel to the plane defined by the cup rim. The inclined gauges are disposed on substantially diametrically opposed sides of the cylinder from one another. The circumferentially oriented gauges are disposed at the same angular positions, i.e., the same azimuth angles as respective ones of the longitudinally oriented gauges. The seven gauges include a first additional gauge disposed in a second additional plane parallel to the plane of the cup rim and located on a side thereof opposite the first additional plane. The first additional gauge is disposed at the same angular position with respect to the cylinder as one of the inclined gauges. A second additional gauge is disposed in the second additional plane on the side of the cylinder opposite the first additional gauge. The first and second additional gauges are oriented parallel to one another and at a 45° angle with respect to the second additional plane.

In accordance with another, alternative, feature of the present invention, the circumferentially oriented gauges, the inclined gauges and one of the longitudinally oriented gauges are disposed in the plane defined by the cup rim. The inclined gauges overlie one another on a side of the cylinder opposite the one of the longitudinally oriented gauges disposed in the plane of the cup rim. The other of the longitudinally oriented gauges is disposed in another plane parallel to and spaced from the plane of the cup rim. The inclined gauges and the longitudinally oriented gauges are disposed at azimuth angles with respect to the cylinder offset by 90° from the angular positions from the circumferentially oriented gauges. The seven gauges include an additional gauge lying in the second plane in a circumferential direction with respect to the cylinder. The additional gauge is angularly spaced by 90° from the longitudinally oriented gauge disposed in the second transverse plane.

In accordance with another embodiment of the present invention, the circumferentially oriented gauges are disposed in the plane of the cup rim. The longitudinally oriented gauges and the inclined gauges are disposed in a first additional plane parallel to and spaced from the plane of the cup rim. The inclined gauges overlie one another at the same angular position as one of the circumferentially oriented gauges. The longitudinally oriented gauges have angular positions staggered by 90° with respect to the angular positions of the circumferentially oriented gauges. The seven gauges include a first additional gauge oriented parallel to the axis of the cylinder, i.e., longitudially, and disposed in a second additional plane which is parallel to and spaced from the plane of the cup rim and which is located on a side thereof opposite the first additional plane. The first additional gauge has the same azimuth angle as one of the longitudinally oriented gauges. A second additional gauge is disposed in the second additional plane at the same angular position with respect to the cylinder as the inclined gauges, the second additional gauge being inclined at a 45° angle with respect to the second additional plane.

In accordance with a further particular feature of the present invention, a multiplicity of high-resistance resistors equal in number to all of the gauges are provided. The resistors are connected at one end to each other and at another end in series with respective gauges to form a multiplicity of parallel circuits each comprising a strain gauge and a respective resistor. The circuits are connectable between the terminals of the current supply, the computing means being operative connectable to each circuit between the strain gauge and the resistor thereof.

Alternatively, there may be provided a multiplicity of current sources equal in number to all of the strain gauges. These current sources are connected at one end to each other and at another end in series with respective ones of the gauges to form a multiplicity of circuits each including a strain gauge and a respective current source. The computing means are operatively connectible to each such circuit between the strain gauge and the current source thereof.

Instead of a multiplicity of current sources equal in number to the gauges, a pair of parallel current sources may be provided together with switching means for connecting the current sources sequentially to different pairs of the gauges to form different pairs of circuits each including a strain gauge and a respective one of the current sources. The computing means is operatively connectable to each circuit between the strain gauge and the current source thereof.

BRIEF DESCRIPTION OF THE DRAWING

FIG. 3c is a diagram showing the directions of orthogonal force components and orthogonal torque components applied to the measuring body of FIG. 3a.

DETAILED DESCRIPTION

Figure 1:
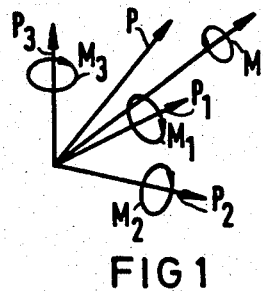
FIG. 1 is a diagram showing three orthogonal components of a composite force and three orthogonal components of a composite or total torque.

As illustrated in FIG. 1, a force P acting on a body may be resolved into three mutually perpendicular components $P_1$, $P_2$ and $P_3$ oriented along respective axes of a 3-dimensional orthogonal coordinate system. Similarly, a torque M acting on the body may be resolved into three mutually perpendicular torque components $M_1$, $M_2$ and $M_3$ lying along the axes of the same coordinate system.

Figure 2A:
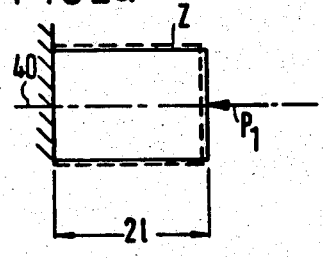
FIG. 2a is a schematic side view of a cylindrical measuring body, showing the deformation thereof under a force component of FIG. 1.

As illustrated in FIG. 2a, a measuring cylinder Z of length 21 is simultaneously shortened in an axial or longitudinal direction and expanded in a radial or transverse direction by an axially exerted compression force $P_1$. The cylinder is firmly anchored at one end (the left hand side of FIG. 2a), while the compressive force $P_1$ acts upon the cylinder at the free end thereof.

Figure 2B:
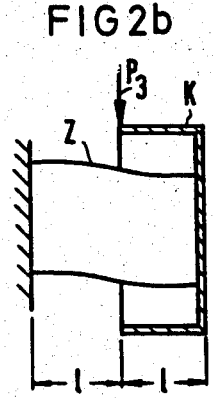
FIG. 2b is a partially cross-sectional schematic side view of a cylindrical measuring body having a cup-shaped member attached to the free end thereof, showing the deformation of the cylindrical body in response to a force component applied to the cup.

As illustrated in FIG. 2b, measuring cylinder Z may be provided at its free end with a rigidly attached force introduction member K in the form of a cup partially surrounding the cylinder so that the rim of the cup defines a plane B (FIG. 3a) which is perpendicular to an axis of symmetry 40 of the cylinder Z. A transversely directed force $P_3$ acting on the rim of cup K bends measuring cylinder Z into an S-shape. The rim of cup K determines the force-introduction plane for transversely acting forces. In the example of FIG. 2b, the force introduction plane is located in the center of measuring cylinder Z.

Figure 2C:
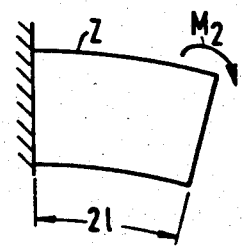
FIG. 2c is a schematic side view similar to FIG. 2a, showing the deformation of the cylindrical measuring body in response to a torque component shown in FIG. 1.
Figure 2D:
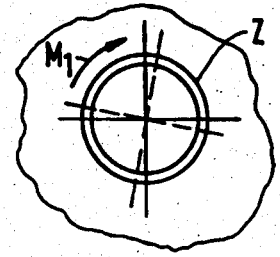
FIG. 2d is a schematic end view of the cylindrical measuring device of FIGS. 2a and 2c, showing the torsional deformation of the cylindrical measuring body in response to another torque component shown in FIG. 1.

FIG. 2c shows the bending-type deformation of measuring body Z caused by torque component $M_2$, while FIG. 2d shows that a torque component $M_1$ acting on the measuring cylinder Z about its longitudinal axis 40 causes torsion of cylinder Z.

Figure 3A:
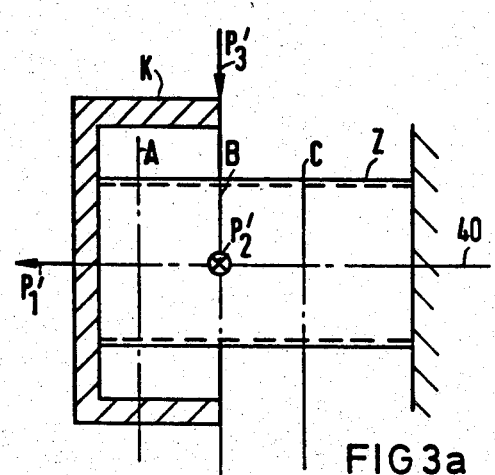
FIG. 3a is a partially cross-sectional side view of the cylindrical measuring body and cup of FIG. 2b, showing the points of application of orthogonal force components to the measuring body.
Figure 3B:
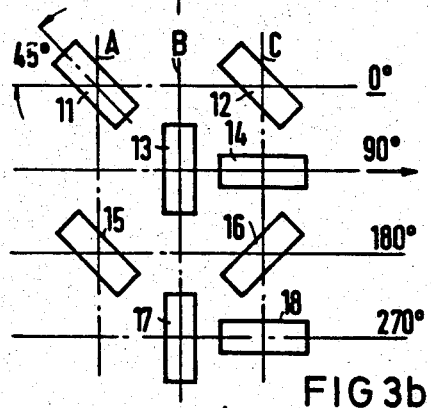
FIG. 3b is a diagram showing the positions and orientations of a multiplicity of wire strain gauges on the cylindrical measuring body of FIG. 3a, in accordance with the invention.

As shown in FIGS. 3a and 3b, eight wire strain gauges 11-18 are attached (e.g., by cement) to the outside surface of cylinder Z in three parallel planes A, B and C which extend perpendicularly to the axis 40 of cylinder Z. The rim of cup K lies in the plane B and thereby defines the location thereof. Plane A is spaced from plane B on the same side thereof as cup K. Plane C is disposed on a side of plane B opposite plane A.

In accordance with the configuration of the wire strain gauges 11-18 illustrated in FIG. 3b, strain gauges 11 and 12 are located on the same side of cylindrical body Z, e.g., on the bottom side thereof, this bottom location being defined by an azimuth angle of 0°. Gauges 11 and 12 are oriented parallel to one another and at an angle of 45° with respect to planes A and C. Gauges 11-18 include a pair of gauges 13 and 17 lying in plane B in a circumferential direction with respect to cylinder Z. Gauges 13 and 17 are located on opposite sides of cylinder Z and have angular positions staggered by 90° with respect to the angular positions of gauges 11 and 12. Thus, gauges 13 and 17 have respective azimuth angles of 90° and 270°. Gauges 11-18 include another pair of gauges 14 and 18 which are located on the same sides of cylinder Z as gauges 13 and 17, respectively, i.e., which have azimuth angles of 90° and 270°. Gauges 14 and 18 are oriented in a longitudinal direction (parallel to axis 40 of cylinder Z) and are both disposed in plane C. The strain gauge configuration of FIG. 3b includes a further pair of gauges 15 and 16 disposed in planes A and C, respectively, and on the top side of cylinder Z, i.e., at an azimuth angle of 180°. Gauges 15 and 16 are oriented at a 90° angle with respect to one another and at a 45° angle with respect to planes A and C.

Figure 3C:
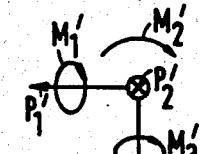

FIG. 3c shows the orientation of orthogonal force components $P_1'$, $P_2'$ and $P_3'$ and orthogonal torque components $M_1'$, $M_2'$ and $M_3'$. These components represent the components of a composite unbalanced force and a composite torque acting on measuring body Z and cup K.

Table I below sets forth a deformation matrix showing the normalized effects of force components $P_1'$, $P_2'$ and $P_3'$ and of the torque components $M_1'$, $M_2'$ and $M_3'$ on the wire strain gauges 11-18 of FIG. 3b. In addition, Table I lists the plane A, B or C in which each wire gauge is disposed, the angular position or azimuth angle of each strain gauge and the angular orientation of each gauge with respect to planes A, B or C.

TABLE I

| Gauge | Plane | Azimuth Angle | Orientation | $P_1'$ | $P_2'$ | $P_3'$ | $M_1'$ | $M_2'$ | $M_3'$ |
|---|---|---|---|---|---|---|---|---|---|
| 11 | A | 0° | −45° | +0.5 | 0 | +0.5 | −1 | +1 | 0 |
| 12 | C | 0° | −45° | +0.5 | 0 | −0.5 | −1 | +1 | 0 |
| 13 | B | 90° | 90° | −0.3 | 0 | 0 | 0 | 0 | −0.3 |
| 14 | C | 90° | 0° | +1 | −1 | 0 | 0 | 0 | +1 |
| 15 | A | 180° | −45° | +0.5 | 0 | −0.5 | −1 | −1 | 0 |
| 16 | C | 180° | +45° | +0.5 | 0 | +0.5 | +1 | −1 | 0 |
| 17 | B | 270° | 90° | −0.3 | 0 | 0 | 0 | 0 | +0.3 |
| 18 | C | 270° | 0° | +1 | +1 | 0 | 0 | 0 | −1 |

The deformation matrix of Table I shows the effect on each strain gauge 11-18 of each force component $P_1'$, $P_2'$ and $P_3'$ and of each torque component $M_1'$, $M_2'$ and $M_3'$. Thus, the exertion on the measuring cylinder Z and K of longitudinally acting force $P_1'$ (see FIG. 3a) results the deformation of each strain gauge 11-18 in the relative amounts indicated by the numbers in the fifth column of Table I. The application of transversely acting force $P_2'$ to the rim of cup K results in the compression of strain gauge 14 (the compression being symbolized by a minus sign) and in the stretching or tensile loading of strain gauge 18. The application of torque component $M_1'$ to the measuring body results in the compressive loading of gauges 11, 12 and 15 and in the tensile loading of gauge 16, as indicated in the eighth column of Table I. The normalized effects of the other force and torque components on the strain gauges 11-18 are set forth in Table I.

The first column of Table II below lists seven pairs of gauges while the second column lists seven measured values C1-C7 each representing the difference between the voltage drops across the respective pair of strain gauges. For example, measured value C4 represents the difference in the voltage drops across gauges 15 and 16. The third column of Table II sets forth algebraic expressions corresponding to measured values C1-C7, the terms of the algebraic expressions including whole number and fractional multiples of force components $P_1'$, $P_2'$ and $P_3'$ and torque components $M_1'$, $M_2'$ and $M_3'$. These algebraic expressions are easily derived from the normalized values listed in Table I.

TABLE II

| Gauge Voltage Difference | Measured Value | Composed of: |
|---|---|---|
| 13−18 | C1 | $-1.3 P_1' - P_2' + 0.7 M_3'$ |
| 14−17 | C2 | $+1.3 P_1' - P_2' + 0.7 M_3'$ |
| 14−18 | C3 | $-2 P_2' + 2 M_3'$ |
| 15−16 | C4 | $-P_3' - 2 M_1'$ |
| 11−12 | C5 | $+P_3'$ |
| 13−17 | C6 | $-0.6 M_3'$ |
| 12−15 | C7 | $+2 M_2'$ |

From the algebraic expressions in Table II the following equations are readily derived for calculating from the measurements of the voltage drops across gauges 11-18 the values of the force and torque components $P_1'$, $P_2'$, $P_3'$ and $M_1'$, $M_2'$ and $M_3'$.

$$+3.33 \cdot C6 + C3 = +2 M_3' - 2 P_2' - 2 M_3' \quad (1)$$

$$P_2' = C6 \cdot (+3.33) + C3 \quad (2)$$

$$C5 + C4 = +P_3' - P_3' - 2M_1' \quad (3)$$

$$2M_1' = -C5 - C4 \quad (4)$$

$$2M_2 = C7 \quad (5)$$

$$M_3' = C6 \cdot (-1.66) \quad (6)$$

$$C2 - C1 = 1.3 P_1' - P_2' + 0.7 M_3' \quad (7)$$

$$-1.3 P_1' + P_2' - 0.7 M_3' \quad (8)$$

$$= -2.6 P_1' \quad (9)$$

$$P_1' = C2 \cdot (-0.385) - C1 \cdot (-0.385) \quad (10)$$

$$P_3' = C_5 \tag{11}$$

Figure 4:
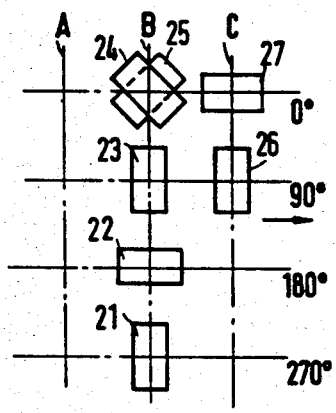
FIG. 4 is a diagram similar to FIG. 3b, showing another configuration of wire strain gagues on the cylindrical measuring body of FIG. 3a, in accordance with the present invention.

As illustrated in FIG. 4, in a second configuration of wire strain gauges according to the present invention, a first pair of gauges 21 and 23 are disposed on opposite sides of cylinder Z, e.g., at azimuth angles of 90° and 270°, and are located in the plane B defined by the rim of cup K. Gauges 21 and 23 are oriented in a circumferential direction with respect to the cylinder Z. Also disposed in plane B is a second pair of gauges 24 and 25 overlying one another and disposed at an angular position with respect to cylinder Z staggered by 90° with respect to the angular positions of gauges 21 and 23. Gauges 24 and 25 are disposed at a 90° angle with respect to one another and at 45° angles with respect to plane B. In the strain gauge configuration of FIG. 4, a third pair of gauges 22 and 27 are disposed on opposite sides of cylinder Z with respect to one another, e.g., at respective azimuth angles of 0° and 180°. Strain gauges 22 and 27 are disposed in respective transverse planes B and C and are oriented in a longitudinal direction parallel to the axis of symmetry 40 of cylinder Z. A seventh strain gauge 26 is disposed in plane C parallel to gauges 21 and 23 and at the same azimuth as gauge 23. While plane A is shown in FIG. 4, it is not occupied by wire strain gauges.

Table III below is a deformation matrix setting forth in normalized form the deformations of strain gauges 21–27 in response to force components $P_1'$, $P_2'$ and $P_3'$ and torque components $M_1'$, $M_2'$ and $M_3'$.

TABLE III

| Gauge | $P_1'$ | $P_2'$ | $P_3'$ | $M_1'$ | $M_2'$ | $M_3'$ |
|---|---|---|---|---|---|---|
| 21 | −0.3 | 0 | 0 | 0 | 0 | +0.3 |
| 22 | +1 | 0 | 0 | 0 | −1 | 0 |
| 23 | −0.3 | 0 | 0 | 0 | 0 | −0.3 |
| 24 | +0.5 | 0 | 0 | +1 | +0.5 | 0 |
| 25 | +0.5 | 0 | 0 | −1 | +0.5 | 0 |
| 26 | −0.3 | −0.3 | 0 | 0 | 0 | −0.3 |
| 27 | +1 | 0 | +1 | 0 | +1 | 0 |

From the normalized deformation values set forth in Table III the equations listed below are derivable for calculating the force and torque components of a composite unbalanced force and a composite torque applied to a cylindrical measuring body bearing the strain gauge configuration of FIG. 4. In the equations below, the expressions in parentheses on the left sides of the equations represent the differences between the voltage drops across the pairs of wire strain gauges whose reference numerals are set forth within the parentheses.

$$(24 - 25) = 2 M_1' \tag{12}$$
$$(21 - 23) = 0.6 M_3' \tag{13}$$
$$(21 - 26) - (21 - 23) = 0.3 P_2' \tag{14}$$
$$(24 - 23) - (21 - 22) + (22 - 24) = 2.5 P_1' \tag{15}$$
$$(21 - 22) - (24 - 23) - 2 P_1' - M_1' = 1.5 M_2' \tag{16}$$
$$(22 - 27) + 2 M_2' = -P_3' \tag{17}$$

Figure 5:
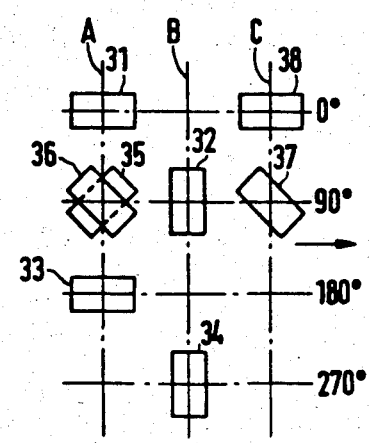
FIG. 5 is another diagram, similar to FIGS. 3b and 4, showing yet another configuration of wire strain gauges in accordance with the invention.

As illustrated in FIG. 5, yet another configuration of strain gauges according to the present invention includes a first pair of gauges 32 and 34 disposed in the plane B of the cup rim. Gauges 32 and 34 are oriented in a circumferential direction with respect to cylinder Z and are located on opposite sides thereof, e.g., at azimuth angles of 90° and 270°, respectively. A second pair of gauges 31 and 33 are disposed in plane A at angular positions staggered by 90° with respect to the angular positions of gauges 32 and 34. Gauges 31 and 33 are oriented in a longitudinal direction parallel to the axis 40 of cylinder Z. A third pair of gauges 35 and 36 overlie one another in plane A and have the same angular position as strain gauge 32. Gauges 35 and 36 are angled at 90° with respect to one another and at 45° with respect to plane A. A first additional gauge 37 is disposed in plane C at the same angular position as gauges 32, 35 and 36, gauge 37 being oriented at a 45° angle with respect to plane C. A second additional gauge 38 parallel to axis 40 of cylinder Z is disposed in plane C at the same azimuth angle as gauge 31. The normalized deformations of gauges 31–38 in response to force component $P_1'-P_3'$ and torque component $M_1'-M_3'$ are enumerated in Table IV. Table IV also shows the plane A, B or C in which each gauge is disposed, the azimuth angle of the gauge and the orientation angle of the gauge with respect to planes A, B and C.

TABLE 4

| Gauges | Plane | Azimuth Angle | Orientation | $P_1'$ | $P_2'$ | $P_3'$ | $M_1'$ | $M_2'$ | $M_3'$ |
|---|---|---|---|---|---|---|---|---|---|
| 31 | A | 0° | 0° | +1 | 0 | −1 | 0 | −1 | 0 |
| 32 | B | 90° | 90° | −0.3 | 0 | 0 | 0 | 0 | +0.3 |
| 33 | A | 180° | 0° | +1 | 0 | +1 | 0 | +1 | 0 |
| 34 | B | 270° | 90° | −0.3 | 0 | 0 | 0 | 0 | −0.3 |
| 35 | A | 90° | +45° | +0.5 | −0.5 | 0 | −1 | 0 | −0.5 |
| 36 | A | 90° | −45° | +0.5 | −0.5 | 0 | +1 | 0 | −0.5 |
| 37 | C | 90° | −45° | +0.5 | +0.5 | 0 | +1 | 0 | −0.5 |
| 38 | C | 0° | 0° | +1 | 0 | +1 | 0 | −1 | 0 |

From the deformation values set forth in Table IV the following equations may be derived for calculating the values of the forces and torque components, the expressions in the parentheses on the left sides of the equations representing the differences in the voltage drops across the gauges whose reference numerals are set forth within the respective parenthesis.

$$(31 - 32) = 1.3 P_1' - P_3' - M_2' - 0.3 M_3' \tag{18}$$
$$(34 - 33) = -1.3 P_1' - P_3' - M_2' - 0.3 M_3' \tag{19}$$
$$(31 - 32) - (34 - 33) = 2.6 P_1' \tag{20}$$
$$(37 - 36) = +P_2' \tag{21}$$
$$(38 - 31) = 2 P_3' \tag{22}$$
$$(36 - 35) = 2 M_1' \tag{23}$$
$$(33 - 31) = 2 P_3' + 2 M_2' \tag{24}$$
$$(38 - 31) = 2 P_3' \tag{25}$$
$$(33 - 31) - (38 - 31) = 2 M_2' \tag{26}$$
$$(32 - 34) = 0.6 M_3' \tag{27}$$

In the wire guage configuration of FIG. 5, the value of torque component $M_2'$ could be calculated by simply computing the difference between the voltage drops across gauges 33 and 38. This, however, has not been done in the equations for circuit reasons.

Figure 6:
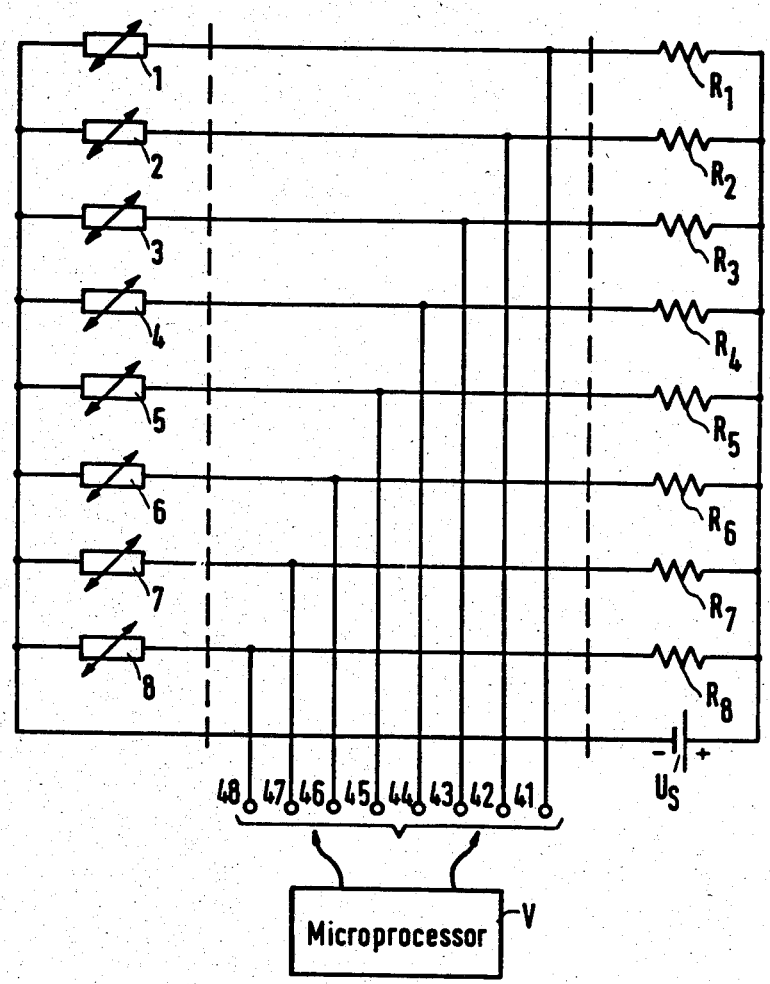
FIG. 6 is a diagram of a circuit including the strain gauges of FIG. 3b or 5, used in measuring voltage drops across the strain gauges to determine the orthogonal components of a composite unbalanced force and a composite torque exerted on the measuring body.

As illustrated in FIG. 6, wire strain gauges 1-8 are connected in series with respective resistors $R_1$-$R_8$ and in parallel with one another. Each gauge and the respective resistor connected in series thereto forms a respective voltage divider circuit in parallel with the other divider circuits. A current source $U_S$ is connected at one terminal to resistors $R_1$-$R_8$ and at another terminal to gauges 1-8. Each voltage divider circuit is connected at a point between the respective strain gauge and the respective resistor to a microprocessor V via a respective lead 41-48. Microprocessor V detects the voltage drops across gauges 1-8 and calculates the voltage differences in equations (2), (4), (5), (10) and (11) to derive the values of the force and torque components. Strain gauges 21-27 or 31-38 may be connected in a voltage divider network similar to that illustrated in FIG. 6 for implementing the calculations of equations (12)-(17) and (18)-(27), respectively.

Resistors $R_1$-$R_8$ of FIG. 6 may be replaced by respective constant current sources, in which case current supply $U_S$ is omitted. The parallel-connected ends of the constant current sources are directly connected to the parallel-connected ends of the strain gauges.

Figure 7:
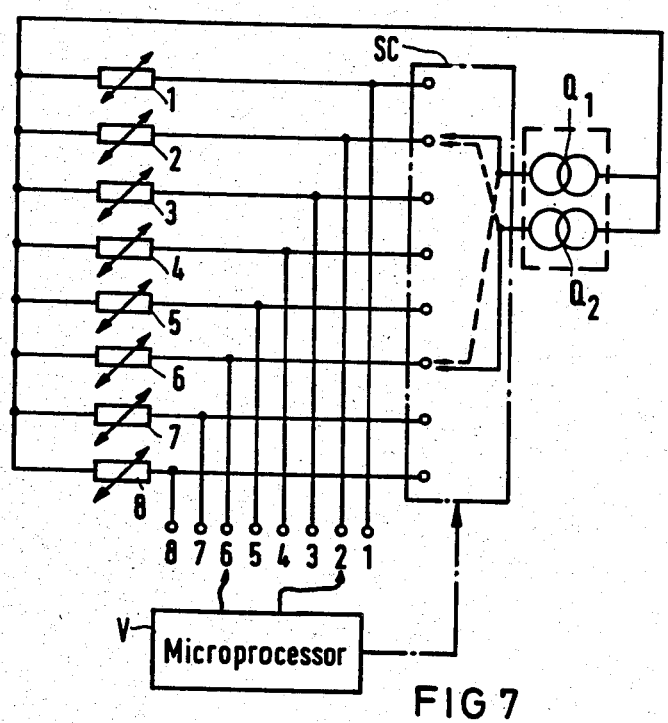
FIG. 7 is a diagram of another voltage measuring circuit including the strain gauges of FIG. 3b or 5.

As illustrated in FIG. 7, the strain wire gauges 1-8 may be connected in parallel in a circuit which includes a pair of parallel-connected constant current sources $Q_1$ and $Q_2$. The electrical measuring circuit further includes a switching circuit SC connected to the strain gauges 1-8 and to current sources $Q_1$ and $Q_2$ for connecting the current sources sequentially to different pairs of the gauges to form different pairs of circuits each including a strain gauge and a respective one of the current sources. The switching circuit SC is connected at a control input to microprocessor V for receiving therefrom control signals determining which pairs of gauges are connected to which current sources in which sequence. In order to average contact resistances and contact potentials in the switching operation, it can be provided that two measurements with polarity-reversed constant current sources are made in one wire strain gauge pair, as indicated by dashed connecting lines in FIG. 7.

Although the invention has been described in terms of specific embodiments and applications, persons skilled in the art, in light of this teaching, can generate additional embodiments without exceeding the scope or departing from the spirit of the claimed invention. Accordingly, it is to be understood that the drawings and descriptions in this disclosure are proffered to facilitate comprehension of the invention and should not be construed to limit the scope thereof.

What is claimed is:

1. A device for use in the measurement of multicomponent forces and torques, said device connectable to a current supply, computing means being connectable to said device for calculating, in response to electrical signals therefrom orthogonal components of a composite unbalanced force and orthogonal components of a composite torque acting on said device, said device comprising:

an elastically and substantially uniformly deformable body in the form of a hollow cylinder firmly clamped at one end and rigid at an opposite end with a force introduction cup partially surrounding said cylinder;

a multiplicity of wire strain gauges mechanically attached to said deformable body and electrically connected at one end to each other, said gauges being operatively connectable to the current supply and to the computing means for supplying to said computing means voltages partially determined by the magnitudes and directions of the composite unbalanced force and composite torque acting on the device and partially determined by the respective positions and respective orientations of said gauges with respect to said body, said gauges being disposed about said deformable body at positions and orientations so that sufficient number of equations are available for use by said computing means to calculate each component of the composite unbalanced force and each component of the composite torque acting on the device, said gauges including at least seven gauges mounted on said cylinder in at least two parallel planes extending substantially transversely to an axis of symmetry of said cylinder, said cup having a rim defining one of said planes, said seven gauges including a first pair of gauges oriented parallel to said axis and perpendicularly to said planes and disposed on diametrically opposed sides of said cylinder, said seven gauges further including a second pair of gauges lying in said planes in a circumferential direction with respect to said cylinder and disposed on diametrically opposed sides of said cylinder from one another, said seven gauges further including at least a third pair of gauges inclined at substantially 45° to said planes and substantially 90° with respect to one another.

2. The device defined in claim 1 wherein the gauges of said third pair of gauges are disposed on the same side of said cylinder in the same one of said planes and overlie one another.

3. The device defined in claim 1 wherein the gauges of said third pair of gauges are disposed on the same side of said cylinder in different ones of said planes.

4. The device defined in claim 1 wherein said second pair of gauges is disposed in the plane defined by said rim and wherein said first pair of gauges and said third pair of gauges are disposed in a first additional plane spaced from and parallel to the plane defined by said rim, the gauges of said third pair of gauges being disposed on substantially diametrically opposed sides of said cylinder, each of said second pairs of gauges being disposed at the same angular position with respect to said cylinder as a respective one of said first pair of gauges, said seven gauges including a first additional gauge disposed in a second additional plane parallel to said plane defined by said rim and located on a side thereof opposite said first additional plane, said first additional gauge being disposed at the same angular position with respect to said cylinder as one of said third pair of gauges, further comprising a second additional gauge disposed in said second additional plane on a side of said cylinder opposite said first additional gauge, said first and said second additional gauge being oriented parallel to one another at a 45° angle with respect to said second additional gauge.

5. The device defined in claim 1 wherein said second pair of gauges, said third pair of gauges and one of said first pair of gauges are disposed in the plane defined by said rim, the gauges of said third pair of gauges overlying one another on a side of said cylinder opposite said one of said first pair of gauges, the other of said first pair of gauges being disposed in another plane parallel to and spaced from said plane defined by said rim, said third pair of gauges and said one of said first pair of gauges being disposed at angular positions with respect to said cylinder offset by 90° from the angular positions of the gauges of said second pair of gauges, said seven gauges including an additional gauge lying in said other plane in a circumferential direction with respect to said cylinder, said additional gauge being angularly spaced from said other of said first pair of gauges by 90°.

6. The device defined in claim 1 wherein said second pair of gauges are disposed in the plane by said rim, said first pair of gauges and said third pair of gauges being disposed in a first additional plane parallel to and spaced from said plane defined by said rim, the gauges of said third pair of gauges overlying one another at the same angular position with respect to said cylinder as one of said second pair of gauges, the gauges of said first pair of gauges having angular positions with respect to said cylinder staggered by 90° with respect to the angular positions of the gauges of said second pair of gauges, said seven gauges including a first additional gauge oriented parallel to the axis of said cylinder and disposed in a second additional plane parallel to and spaced from the plane defined by said rim and located on a side thereof opposite said first additional plane, further comprising a second additional gauge disposed in said second additional plane at the same angular position as said third pair of gauges, said second additional gauge being inclined at a 45° angle with respect to said second additional plane.

7. The device defined in claim 1, 2, 3, 4, 5 or 6, further comprising a multiplicity of high-resistance resistors equal in number to all of said gauges, said resistors being connected at one end to each other and at another end in series with respective gauges to form a multiplicity of parallel circuits each comprising a strain guage and a respective resistor, said circuits being connectable between the terminals of the current supply, the computing means be operatively connectable to each circuit between the strain gauge and the resistor thereof.

8. The device defined in claim 1, 2, 3, 4, 5 or 6, further comprising a multiplicity of current sources equal in number to all of said gauges, said current sources being connected at one end to each other and at another end in series with respective ones of said gauges to form a multiplicity of circuits each including a strain gauge and a respective current source, the computing means being operatively connectable to each circuit between the strain gauge and the current source thereof.

9. The device defined in claim 1, 2, 3, 4, 5 or 6, further comprising a pair of parallel current sources and switching means for connecting said current sources sequentially to different pairs of said gauges to form different pairs of circuits each including a strain gauge and a respective one of said current sources, the computing means being operatively connectable to each circuit between the gauge and the current source thereof.

10. A device for use in the measurement of multicomponent forces and torques, said device being connectable to a current supply, computing means being connectable to said device for calculating, in response to electrical signals therefrom, orthogonal components of a composite unbalanced force and orthogonal components of a composite torque acting on said device, said device comprising:

an elastically and substantially uniformly deformable body; and a single electrical circuit including a multiplicity of wire strain gauges mechanically attached to said deformable body and electrically connected at one end to each other, said electrical circuit further including a multiplicity of resistors equal in number to said strain gauges and connected in series with respective ones thereof to form a multiplicity of voltage dividers, said gauges being operatively connectable to the current supply and said voltage dividers being operatively coupled to the computing means for supplying to said computing means voltages partially determined by the magnitudes and direction of the composite unbalanced force and composite torque acting on the device and partially determined by the respective positions and respective orientations of said gauges with respect to said body, said gauges being disposed about said deformable body at positions and orientations so that sufficient number of equations are available for use by said computing means to calculate each component of the composite unbalanced force and each component of the composite torque acting on the device.

11. A device for measuring multicomponent forces and torques, comprising:

an elastically and substantially uniformly deformable body; and a single electrical circuit including:

a multiplicity of wire strain gauges mechanically attached to said deformable body and electrically connected in parallel to each other;

a multiplicity of resistors equal in number to said strain gauges and connected in series with respective ones thereof to form a multiplicity of voltage dividers;

supply means electrically connected to said voltage dividers for supplying electrical current thereto; and computing means operatively coupled to said voltage dividers for detecting voltage drops across said strain gauges and for calculating, in response to said voltage drops, orthogonal components of a composite unbalanced force and a composite torque acting on said deformable body;

said gauges being disposed about said deformable body at respective positions and respective orientations so that a sufficient number of equations are available for use by said computing means to calculate each component of said composite unbalanced force and each component of said composite torque.

* * * * *